United States Patent [19]

Hunsucker

[11] 4,235,763

[45] Nov. 25, 1980

[54] MELAMINE POLYMERIC COMPOSITION

[75] Inventor: Jerry H. Hunsucker, Terre Haute, Ind.

[73] Assignee: International Minerals & Chemical Corp., Terre Haute, Ind.

[21] Appl. No.: 25,640

[22] Filed: Mar. 30, 1979

[51] Int. Cl.³ .......................... C08G 12/32; C08J 3/00; C08L 61/28

[52] U.S. Cl. .......................... 260/29.4 R; 260/29.2 N; 528/254

[58] Field of Search .................. 528/254; 260/29.4 R, 260/29.2 N

[56] References Cited

FOREIGN PATENT DOCUMENTS 625718  8/1961  Canada ........................................ 528/254
690180  4/1953  United Kingdom ........................ 528/254
1002668  8/1965  United Kingdom ........................ 528/254

*Primary Examiner*—Allan Lieberman
*Attorney, Agent, or Firm*—Robert H. Dewey

[57] ABSTRACT

A polymeric melamine composition useful as an adhesive comprising the condensation product of a nitroalkanol of the formula

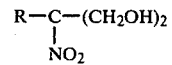

where R is hydroxymethyl, methyl or ethyl, with melamine.

9 Claims, No Drawings

MELAMINE POLYMERIC COMPOSITION

BACKGROUND OF THE INVENTION

This invention relates to a polymeric substance. In a particular aspect, this invention relates to a polymeric substance useful as an adhesive.

Incompletely polymerized melamine resins are widely used as components of adhesives, especially those intended for use in the manufacture of plywood. These thermosetting resins polymerize completely at elevated temperatures without the necessity of a catalyst. However, such resins are relatively expensive and are often used with other polymers.

SUMMARY OF THE INVENTION

It is an object of this invention to provide a novel polymeric substance.

It is another object of this invention to provide a polymeric substance useful as an adhesive.

Other objects of this invention will be apparent to those skilled in the art from the disclosure herein.

It is the discovery of this invention to provide a polymeric melamine composition useful as an adhesive comprising the condensation product of a nitroalkanol of the formula

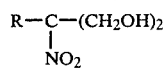

where R is hydroxymethyl, methyl or ethyl, with melamine. The composition is obtained by reacting the nitroalkanol with the melamine in a mole ratio of about 3–4:1 respectively at an elevated temperature and under alkaline conditions.

DETAILED DISCUSSION

The polymeric substance of this invention is readily prepared by reacting the nitrohydroxy compound of the above formula with melamine in about a 3–4:1 mole ratio at a temperature of about 50° C. or more, e.g. 95°, preferably about 60° C., and at a pH of 8 to 11, preferably 9.0–10.0, and 9.5 is particularly preferred.

Sufficient water to provide a homogenous solution of the reactants is used and the reaction is complete when a homogenous mass is obtained. Care should be taken not to carry the reaction too long for otherwise the polymer precipitates and has poor adhesive properties. The aqueous dispersion so obtained is useful as a thermosetting adhesive, or if preferred, the resin can be filtered, dried and ground to a powder.

The nitrohydroxy compounds represented by the above formula are commercially available and include 2-nitro-2-methyl-1,3-propanediol; 2-nitro-2-ethyl-1,3-propanediol and tris(hydroxymethyl)nitromethane. The latter compound is preferred and the 50% aqueous solution, which is commercially available, is particularly preferred for reasons of economy.

It is also an embodiment of this invention that the nitroalkanol can be formed in situ from a nitroalkane of 1 to 3 carbon atoms and 2–3 moles of formaldehyde. Thus, approximately one mole of nitroethane and 2 moles of formaldehyde may be substituted for each mole of 2-nitro-2-methyl-1,3-propanediol. Approximately one mole of 1-nitropropane and 2 moles of formaldehyde may be substituted for each mole of 2-nitro-2-ethyl-1,3-propanediol, and approximately 1 mole of nitromethane and 3 mole of formaldehyde may be substituted for tris(hydroxymethyl)nitromethane. The formaldehyde used preferably is the 37% by weight article of commerce, but paraformaldehyde or alkanol solutions of formaldehyde can be used. The nitroalkanes are all commercially available.

The pH adjustment can be made with an alkaline reagent, many of which are known. These include but are not limited to ammonia, inorganic carbonates, bicarbonates and hydroxides and oxides of, e.g., sodium, potassium, calcium and magnesium. Sodium hydroxide is preferred. Usually the alkaline reagent is used as an aqueous solution. Other useful alkaline reagents include alkylamines and alkanolamines.

The invention will be better understood with reference to the following examples. It is understood that the examples are intended only to illustrate the invention, and it is not intended that the invention be limited thereby.

EXAMPLE 1

To a reaction vessel equipped with a stirring means and a heating means there was delivered 205.5 g of a 50% solution of tris(hydroxymethyl)nitromethane (TN), 1 mole, and 32.0 g of melamine, 0.25 moles. The two materials were thoroughly mixed and the pH was adjusted to 9.5–10 using aqueous sodium hydroxide. The temperature was raised to 70° C. and held there until a dark, red, homogenous mass formed. It was filtered, dried and powdered. The yield was 117 g, 87.1% of theory. The polymer was insoluble in all organic solvents tried and in water. It is useful as a thermosetting adhesive by mixing with enough water to form a paste, spreading on two surfaces to be joined and heated in a press to about 250°–300° F.

EXAMPLE 2

The experiment of Example 1 is repeated in all essential details except that 2-nitro-2-methyl-1,3-propanediol (NMPD) is substituted for TN on an equivalent hydroxy group basis. The polymer so obtained is useful as an adhesive.

EXAMPLE 3

The experiment of Example 2 is repeated in all essential details except that 2-nitro-2-ethyl-1,3-propanediol is substituted for NMPD on an equi-molar basis. A thermosetting polymer is obtained which is useful as an adhesive.

EXAMPLE 4

The experiment of Example 1 is repeated in all essential details except that 1 mole of nitromethane and 3 moles of formaldehyde are substituted for Tn. A thermo-setting polymer useful as an adhesive is obtained.

EXAMPLE 5

The experiment of Example 1 is repeated in all essential details except that 1 mole of 1-nitropropane and 2 moles of formaldehyde are substituted for each mole of 2-nitro-2-ethyl-1,3-propanediol. A thermosetting polymer useful as an adhesive is obtained.

I claim:

1. A polymeric composition comprising the condensation product obtained by the process of reacting in aqueous solution a nitroalkanol of the formula

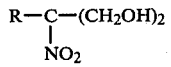

where R is hydroxymethyl, methyl or ethyl, with melamine in a mole ratio of about 3–4:1 respectively at a temperature of 50° to 95° C. at a pH of about 8 to 11 for a period of time sufficient to form the polymer without precipitating same.

2. The polymeric composition of claim 1 wherein R is hydroxymethyl and the mole ratio to melamine is 4:1.

3. The composition of claim 1 wherein R is methyl and the mole ratio to melamine is 3:1.

4. The composition of claim 2 wherein R is ethyl and the mole ratio to melamine is 3:1.

5. The composition of claim 1 wherein the nitroalkanol is formed in situ by substituting an equimolar amount of a nitroalkane of 1–3 carbon atoms and 2 moles of formaldehyde per mole of nitroalkane of 2–3 carbon atoms or 3 moles of formaldehyde per mole of nitroalkane of one carbon atom.

6. The composition of claim 5 wherein the reaction is effected at a pH of about 8 to 11.

7. The composition of claim 5 wherein the reaction is effected at a pH of 9.0–10.0.

8. The composition of claim 1 wherein the reaction is effected at a temperature of about 60° C.

9. The composition of claim 5 wherein the temperature is about 60° C.

UNITED STATES PATENT AND TRADEMARK OFFICE
CERTIFICATE OF CORRECTION

PATENT NO. : 4,235,763
DATED : November 25, 1980
INVENTOR(S) : Jerry H. Hunsucker It is certified that error appears in the above—identified patent and that said Letters Patent are hereby corrected as shown below:

Column 2, line 56, "Tn" should read -- TN --

Signed and Sealed this

Twenty-fifth Day of August 1981

[SEAL]

Attest:

GERALD J. MOSSINGHOFF

Attesting Officer

Commissioner of Patents and Trademarks